(12) United States Patent
Raikar et al.

(10) Patent No.: US 10,192,701 B2
(45) Date of Patent: Jan. 29, 2019

(54) SWITCH ACTUATION APPARATUS AND METHOD

(71) Applicant: GM GLOBAL TECHNOLOGY OPERATIONS LLC, Detroit, MI (US)

(72) Inventors: Sadanand N. Raikar, Karnataka (IN); Jeffrey J. Schultz, Grand Blanc, MI (US); Mukesh Amin, Canton, MI (US); Peggy M. Gossiaux, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 374 days.

(21) Appl. No.: 14/974,748

(22) Filed: Dec. 18, 2015

(65) Prior Publication Data

US 2017/0178846 A1   Jun. 22, 2017

(51) Int. Cl.
| | |
|---|---|
| *B60R 21/20* | (2011.01) |
| *H01H 36/00* | (2006.01) |
| *B60R 21/015* | (2006.01) |
| *B60R 21/203* | (2006.01) |
| *H01F 7/02* | (2006.01) |
| *H01H 11/00* | (2006.01) |
| *H01H 13/52* | (2006.01) |
| *H01H 9/06* | (2006.01) |

(52) U.S. Cl.
CPC ... *H01H 36/0073* (2013.01); *B60R 21/01528* (2014.10); *B60R 21/20* (2013.01); *B60R 21/203* (2013.01); *B60R 21/2037* (2013.01); *H01F 7/0236* (2013.01); *H01H 11/00* (2013.01); *H01H 13/52* (2013.01); *H01H 9/06* (2013.01)

(58) Field of Classification Search
CPC ... H02K 7/09; F16C 32/0423–32/0434; B60R 21/20; B60R 21/203; B60R 21/2035; B60R 21/2037; B60R 21/01528; B60R 21/01504; B60R 21/01508; H01F 7/0236
See application file for complete search history.

(56) References Cited

U.S. PATENT DOCUMENTS 5,367,891 A * 11/1994 Furuyama ............ A44C 5/2057
24/303

FOREIGN PATENT DOCUMENTS

| CN | 1743207 A | 3/2008 |
|---|---|---|
| EP | 1393278 B1 | 3/2004 |
| KR | 20020083828 A | 11/2002 |
| WO | WO2014175565 A1 | 10/2014 |

* cited by examiner

*Primary Examiner* — Ramon M Barrera
(74) *Attorney, Agent, or Firm* — Quinn IP Law

(57) ABSTRACT

An actuation apparatus includes a module movably tethered to a base member. Each of the module and base member include a plurality of magnetic elements aligned in a plurality of paired magnet sets such that in a non-actuated condition a repulsive magnetic force generated by each paired magnet set causes separation of the module and base member. Application of an actuation force to an actuation surface of the module, in opposition to the magnetic repulsive force, causes movement of the module toward the base member such that contact is made between terminals defined by the magnetic elements of at least one of the paired magnet sets, to generate an output signal. In an illustrative example, the base member is a steering wheel armature of a vehicle and the module is a wheel hub assembly including an air bag and a hub cover defining the actuation surface.

18 Claims, 5 Drawing Sheets

SWITCH ACTUATION APPARATUS AND METHOD

TECHNICAL FIELD

The present disclosure relates generally to an apparatus for actuating an electrical switch, and more particularly, to an actuation apparatus including a movable member moved in opposition to a magnetic force.

BACKGROUND

In vehicles equipped with a driver air bag assembly, the air bag assembly is typically included in a steering wheel hub module including the air bag assembly and a hub cover designed to open upon deployment of the air bag. Typically, the hub module is suspended on an armature base plate of the steering wheel armature by four telescoping spring-biased corner posts, which incorporate horn actuation switch contacts or terminals. Depressing the air bag module by applying an actuation force against the hub cover compresses one or more of the springs to make contact with one or more switch terminals to actuate the horn. The actuation force required to make contact with at least one of the switch terminals may also be referred to as the horn effort, and is defined by the condition of the spring. The springs of the spring-biased actuation system can be affected by loads imposed on the springs by the gravitational force resulting from the weight of the hub module and the location of the center of gravity of the hub module relative to the spring placement, which may increase the relative load on one or more of the springs. Over time, the spring force, and the corresponding actuation force and horn effort, can change due to wear and/or fatigue caused by the gravitational loads, such that the horn effort required to actuate the horn may vary from location to location on the actuation surface, e.g., on the hub cover, and from one spring post and/or switch terminal to another. Sagging of the hub module relative to the armature base, due to gravitational loads, may decrease the effort required to actuate the horn in some locations on the hub cover, increasing susceptibility to unintentional actuation of the horn caused by incidental input to those locations, or unintended terminal contact due to incidental hub module movement or vibration during vehicle use.

SUMMARY

A switch actuation apparatus and method of use of the actuation apparatus are provided. The switch actuation apparatus includes a module movably tethered to a base member such that a module face of the module, in a non-actuated condition, is separated from a base face of the base member by repulsive magnetic forces generated between paired magnet sets formed by base magnetic elements arranged on the base face and corresponding module magnetic elements arranged on the module face. Each of the base and module magnetic elements include a terminal such that an actuation force applied to the module which is greater than the repulsive magnetic force causes movement of the module face toward the base face; and such that contact is made between the module and base terminals of at least one of the paired magnet sets, to generate an output signal. The output signal is outputted, for example, to a device electrically connected to the actuation apparatus, such that the device is activated by the output signal. In an illustrative example, the base member is a steering wheel armature of a vehicle and the module is a wheel hub including an air bag assembly interfacing with a hub cover. The actuation force is input to the hub cover and via the air bag assembly to move the wheel hub toward the base face of the armature base. In the illustrative example, contact between the module and base terminals of any one of the paired magnet sets generates an output signal to activate a vehicle horn electrically connected to the actuation apparatus. The horn effort, e.g., the actuation force required to move the module in contact with the armature base to make contact between the terminals of one of the paired magnet sets, is defined by the repulsive magnetic force, which is constant over time. As such, the horn effort remains substantially constant over time in use. The constant repulsive magnetic force maintains the separation distance between the terminals over time and is sufficient to oppose the gravitational forces exerted by the module such that actuation variability due to sag, wear and/or fatigue is avoided, as the non-mechanical magnetic properties of the paired magnet sets remain unchanged over time.

The actuation apparatus described herein is configured to output the output signal when actuated by an actuation force applied to an actuation surface defined by the module. The module includes a plurality of module magnetic elements each defining a module terminal. The base member includes a plurality of base magnetic elements each defining a base terminal. The module is movably tethered to the base member to align each respective module magnet element with a respective base magnetic element to define a plurality of paired magnet sets. In a non-actuated condition the module terminal and the base terminal of each paired magnet set are separated by a separation distance partially defined by a repulsive magnetic force generated between the module magnetic element and the base magnetic element of each respective paired magnet set. The actuation apparatus is actuated by application of an actuation force to the actuation surface of the module, in opposition to the repulsive magnetic force, where the actuation force is greater than the repulsive magnetic force, causing movement of the module toward the base member such that contact is made between the module terminal and the base terminal of at least one of the paired magnet sets to generate an output signal. The repulsive magnetic force generated by each of the paired magnet sets resists movement of the module toward the base member by incidental force inputs to the actuation surface less than the actuation force, thus making the actuation apparatus robust against incidental or non-intentional actuation.

Over time in use, the repulsive magnetic force generated between each of the paired magnet sets remains substantially constant, such that the separation distance is maintained over time in use, and is not subject to change, for example, due to component wear, corrosion or fatigue within the actuation apparatus, gravitational forces acting on the module relative to the base member, or other factors such as operating environmental factors such as temperature, humidity, etc. As such, the actuation apparatus described herein provides increased durability relative to, for example, mechanically actuated switches such as those including springs or other componentry which may corrode, fatigue, and/or wear over time in use. Further, due to the substantially constant and repeatable repulsive magnetic force generated between each of the paired magnet sets over time, the separation distance maintained between the terminals of the paired magnet sets is substantially constant over time, and the actuation force (horn effort in the illustrative example) required to actuate the apparatus, e.g., to overcome the repulsive magnetic force to make contact between the terminals of at least one of the paired magnet sets to generate an output signal, is substantially constant and repeatable over time, providing an actuation apparatus with increased reliability and repeatability relative to a mechanically actuated apparatus.

In the illustrative example of a base member which is an armature of a vehicle steering wheel, and a hub module including an air bag assembly and a hub cover, the actuation surface is defined by the steering wheel hub cover, which interfaces with the air bag assembly. The hub module is movably tethered to an armature base of the steering wheel armature such that an actuation force applied to the actuation surface, e.g., to the wheel hub cover, is transferred via the air bag assembly to a module face to which a plurality of module magnetic elements and a tethering member are attached. The armature base defines a base axis and a base face, and includes a plurality of base magnetic elements mounted to the base face and distributed around the base axis. The armature base further includes at least one latching member. The hub module is movably tethered to the armature base by engaging the tethering member to the latching member, such that in the tethered condition, each of the base magnetic elements is aligned with a respective one of the module magnetic elements to form a paired magnet set, and such that the plurality of module magnetic elements and the plurality of base magnetic elements form a plurality of paired magnet sets. The base magnetic element and the module magnetic element of each paired magnet set are oriented such that a repulsive magnetic force is generated between the base magnetic element and the module magnetic element of each paired magnet set, and such that, in a non-actuated condition, the base magnetic element and the module magnetic element of each paired magnet set are separated by a separation distance partially defined by the repulsive magnetic force and the engagement of the tethering member and the latching member. The separation distance is less than an equilibrium distance defined by the paired magnet set.

Each of the base magnetic elements includes a base terminal, and each of the module magnetic elements includes a module terminal. The actuation apparatus is actuated by contact between the base magnetic element and the module magnetic element of at least one paired magnet set, e.g., by contact of a base terminal and a module terminal of one of the paired magnet sets, where contact of the base and module terminals causes an output signal to be outputted. The output signal can be outputted to an electrically actuated component in electrical communication with the actuation apparatus.

In the illustrative example, the actuation apparatus is configured as a horn switch for a vehicle horn, and the output signal is outputted to activate the vehicle horn, for example, to activate the horn to generate an audible signal. Contact between the base magnetic element and the module magnetic element of at least one paired magnet set occurs when the actuation force applied to the actuation surface, e.g., to the hub cover, is greater than the repulsive magnetic force such that the actuation force causes movement of the hub module, including the air bag assembly and the module face, toward the base face of the armature.

In another illustrative example, the armature base includes first and second latching members which define a latch axis which intersects with the base axis to define a pivot point. The first and second latching members engage the tethering member to movably tether the module to the base member such that the module is pivotable relative to the base member about the pivot point, and such that the module is pivotable in response to an actuation force which is skewed to the base axis to cause contact between fewer than all the paired magnet sets, where contact between the base and module terminals of only one of the paired magnet sets is required to generate the output signal. The actuation apparatus is advantaged by the pivoting movement of the module, by enabling actuation of the apparatus, e.g., actuation of the horn switch, via an actuation force applied to any portion of the hub cover, such that the actuation surface is not limited, for example, to a limited area of the hub cover and such that the actuation force does not have to be applied in a direction parallel to or along the base axis.

A method for assembly the actuation apparatus is provided. The method includes orienting the module relative to the base member such that the module face and the base face are adjacent and each of the base magnetic elements is aligned with a respective one of the module magnetic elements to form the plurality of paired magnet sets. Each of the module face and the base face can include anti-rotation elements which can be configured, for example, such that each module anti-rotation element cooperates with a respective base anti-rotation element to facilitate orienting the module relative to the base member during assembly. In one example, the base and module anti-rotation elements can be keyed to each other or otherwise cooperate such that rotation of the module relative to the base member and about the base axis is limited or prevented, while allowing the module to be movably tethered to and pivotable relative to the base member. The method of assembling the module to the base member further includes applying an assembly force on the module in opposition to the repulsive magnetic force generated between the module and base magnetic elements of each of the paired magnet sets, to engage the tethering member and the latching members. The assembly force is then released such that the latching member which, in an illustrative example, is configured as a hook, upon release of the assembly force exerts a tethering force on the tethering member engaged by the latching member, in opposition to the repulsive magnetic force, to maintain the separation distance between the module and base magnetic elements. In an illustrative example, the tethering member is configured as a cable or wire member, and the hook of the latching member defines an incline face adjacent a latch face. During assembly, the module is moved toward the base member such that the cable tethering member contacts the incline face and is placed in tension as the cable travels along the incline face by continued application of the assembly force and movement of the module toward the base member, until the cable engages the latch face, that is, until the cable travels past the incline face and is engaged by the hook. The assembly method is advantaged by not requiring any fixtures or tooling, as the module is self-orienting via the anti-rotation elements and snaps into place by engagement of the cable tethering member and the hook of the latching member.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
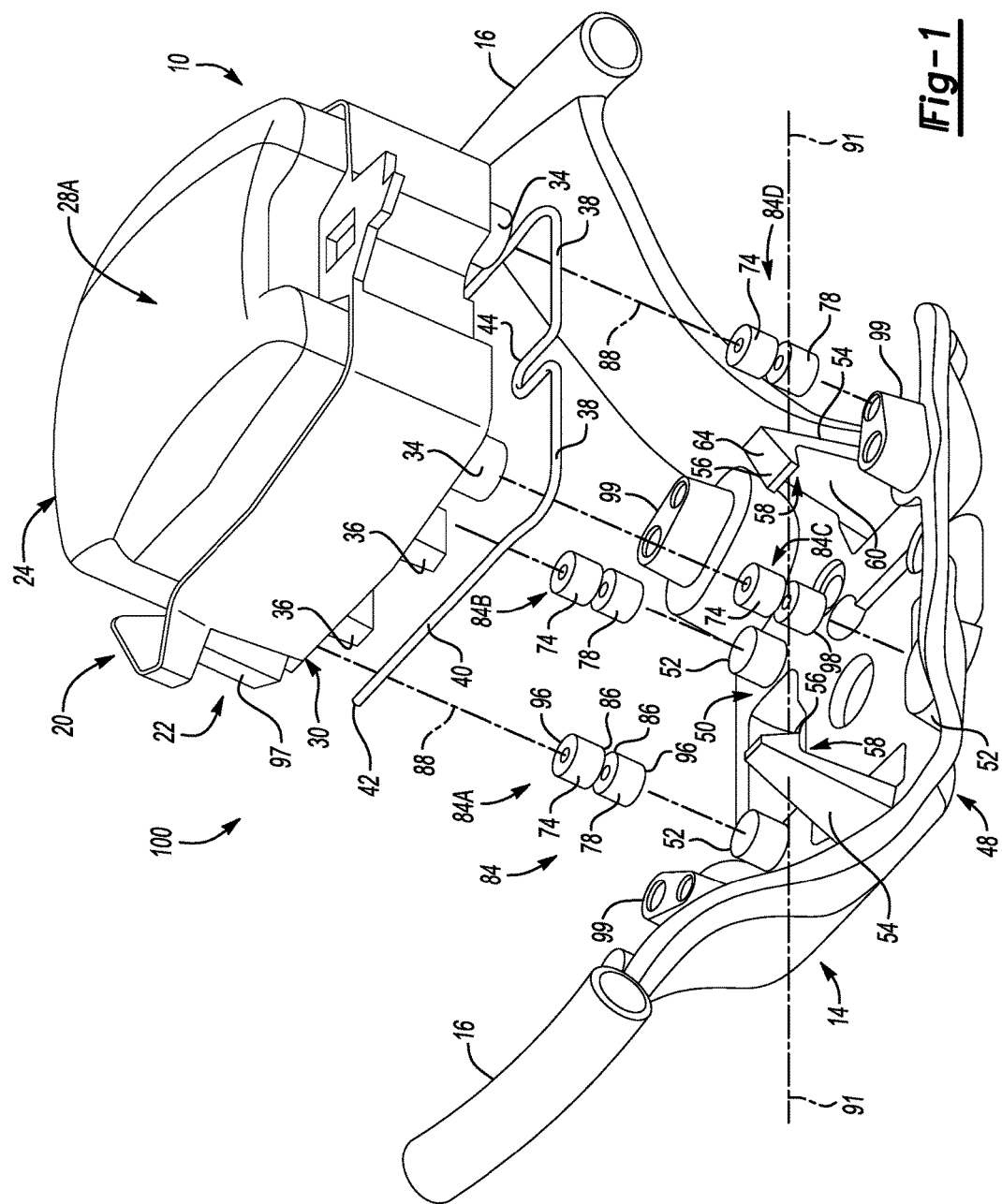
FIG. 1 is an exploded schematic perspective view of a horn switch actuation apparatus of a steering wheel assembly including a hub module, a wheel, and an armature.
Figure 2:
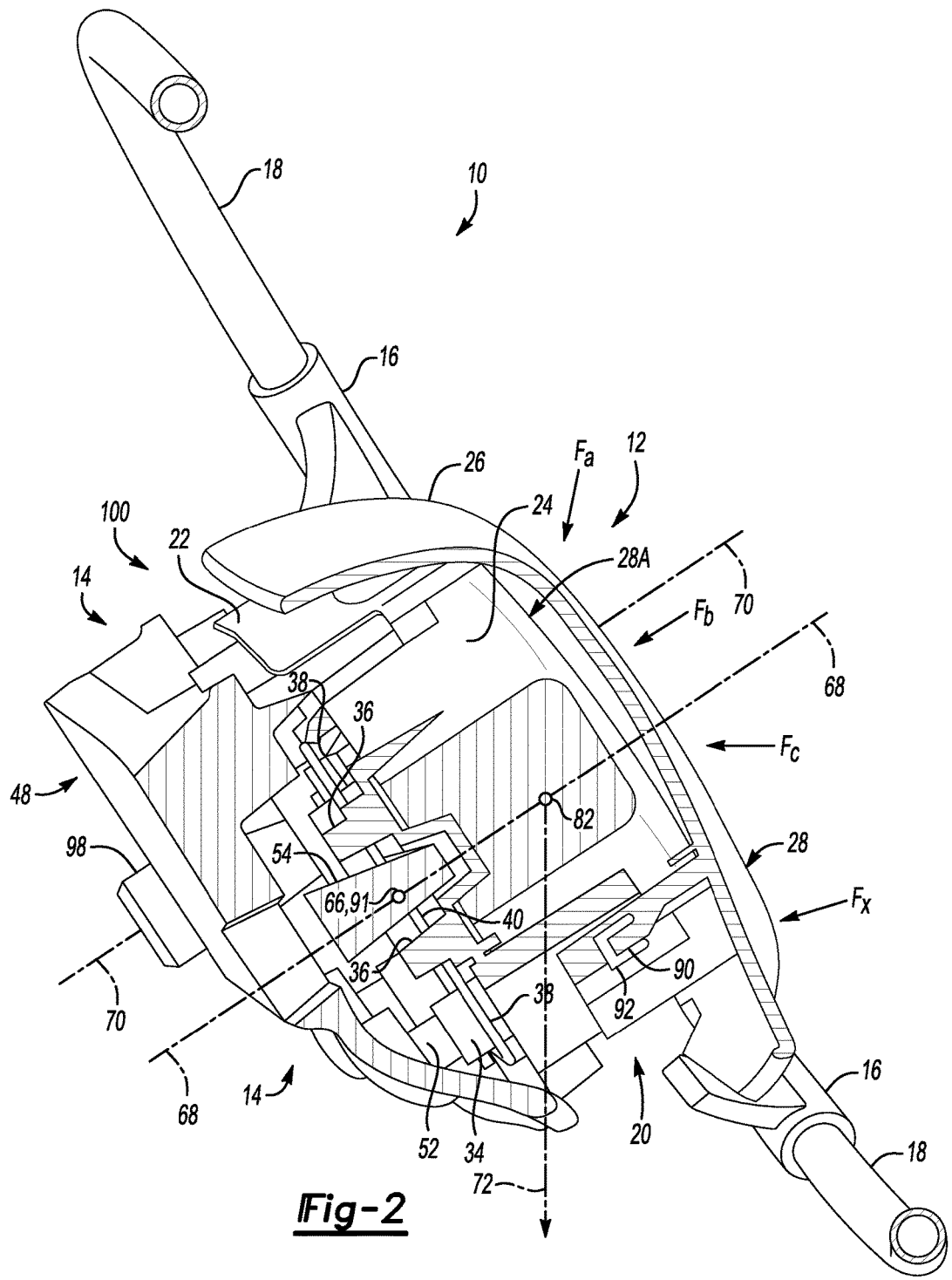
FIG. 2 is a schematic perspective view of the steering wheel assembly of FIG. 1, showing a cross-sectional view of section 2-2 of FIG. 5.
Figure 3:
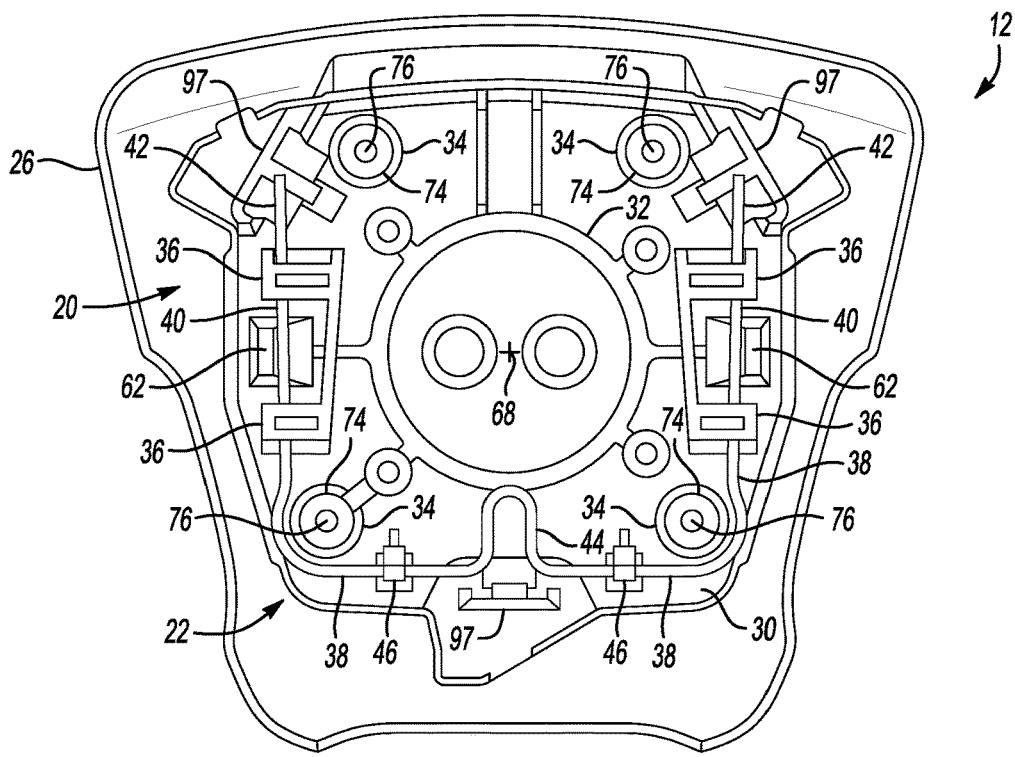
FIG. 3 is a schematic plan view of a module face of the hub module of FIG. 1.

Referring to the drawings wherein like reference numbers represent like components throughout the several figures, the elements shown in FIGS. 1-7C are not to scale or proportion. Accordingly, the particular dimensions and applications provided in the drawings presented herein are not to be considered limiting. Referring to FIGS. 1-6, a switch actuation apparatus is generally indicated at 100. The switch actuation apparatus 100 includes a module generally indicated at 12 and a base member generally indicated at 14. In an illustrative example, the base member 14 is a steering wheel armature 14 of a vehicle steering wheel assembly 10, and the module 12 is a wheel hub module 12 including an air bag assembly 20 and a hub cover 26. The air bag assembly 20 includes an air bag 24 and an air bag inflator 32 which are housed in a hub module housing 22. The module housing 22 defines a module face 30. The hub cover, also referred to herein as the module cover 26, defines an actuation surface 28. The module cover 26, in a non-limiting example shown in FIG. 6, includes one or more cover connectors 92 for connecting the module cover 26 to the housing 22. The housing 22, in a non-limiting example, includes one or more housing connectors 90 for receiving the cover connectors 92 to connect the module cover 26 to the housing 22. In a non-limiting example, the cover connector 92 is configured as a tang and the housing connector 90 is configured as a slot to receive the tang 92, although other combinations of connectors 90, 92 could be used. The hub cover 26 interfaces with the air bag assembly 20 via an interface surface 28A defined by the air bag 24, such that an actuation force F applied to the actuation surface 28 is transferred to the module face 30 via the interface surface 28A and the air bag 24. A tethering member 38 is attached to the module face 30 by retainers 36 and clips 46, as shown in FIG. 3 and in an exploded view in FIG. 1. In the non-limiting example shown, the tethering member 38 is configured as a cable, which may be, for example, a metal wire. The tethering member 38 is generally U-shaped, including a connecting segment 44 intermediate tethering segments 40. The tethering segments 40 terminate in tether ends 42. The tethering member 38, in the non-limiting example, is attached to the module face 30 by inserting each of the tether ends 42 through a respective pair of retainers 36 and clipping the connecting segment 44 of the tethering member to clips 46, as shown in FIG. 3. In the attached position, each of the tethering segments 40 are suspended between and supported by a respective pair of retainers 36.

Figure 4:
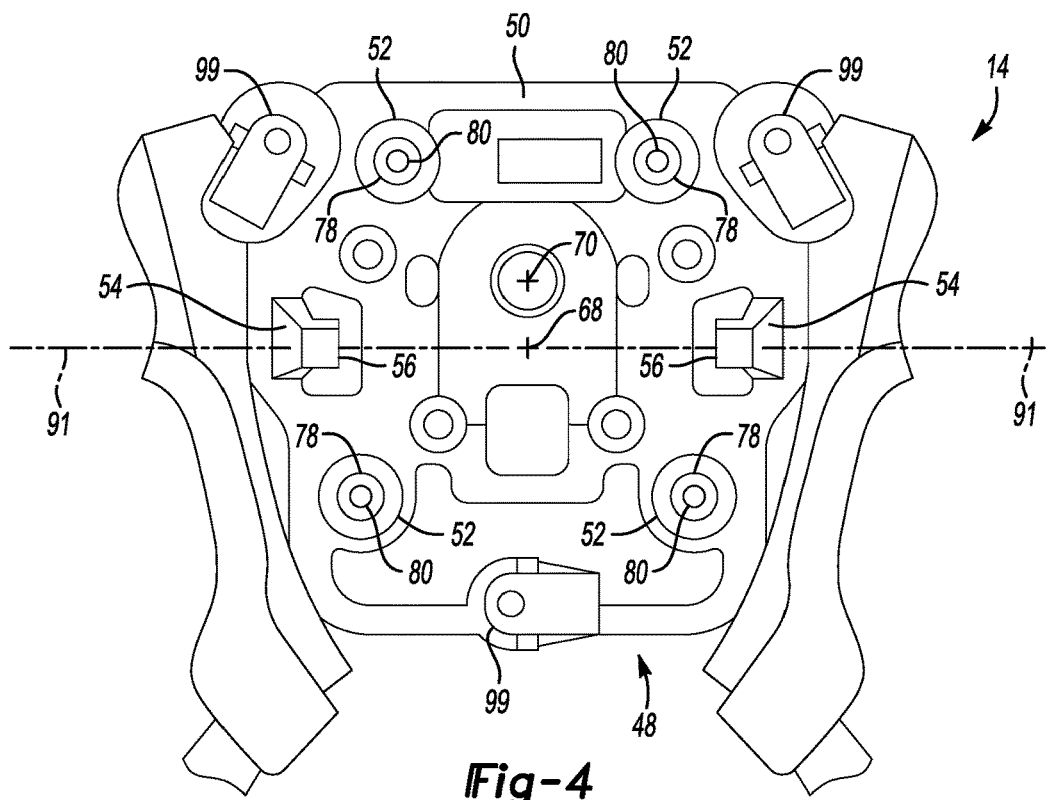
FIG. 4 is a schematic plan partial view of a base face of an armature base of the armature of FIG. 1.
Figure 5:
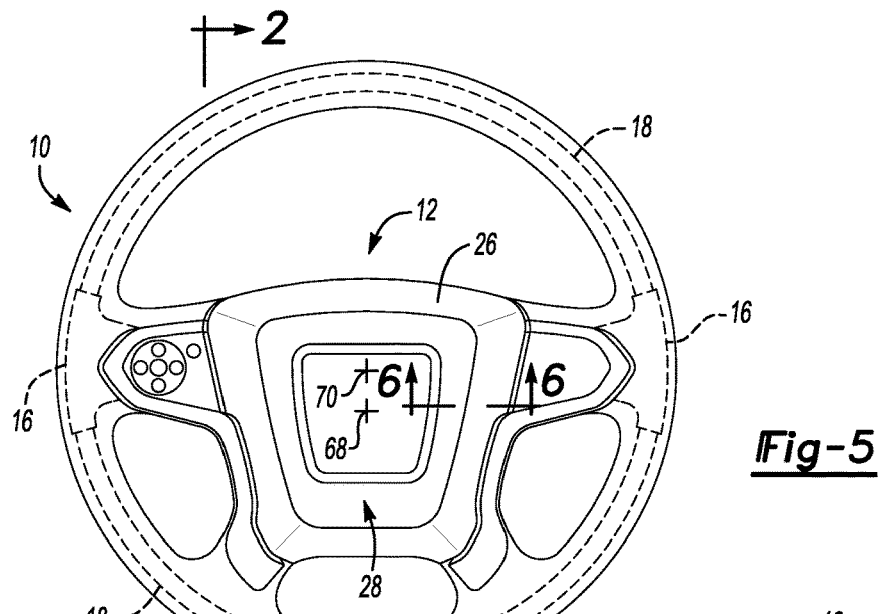
FIG. 5 is a schematic plan view of the steering wheel assembly of FIG. 1.

The armature 14 includes an armature base 48 from which wheel attachments 16 extend. As shown in FIGS. 2 and 5, the steering wheel assembly 10 further includes a steering wheel 18 which is attached to the armature 14 via the wheel attachments 16. The armature base 48 may be referred to herein as a base 48. The base 48 defines a base face 50, which may also be referred to herein as an armature face 50. As shown in FIGS. 1 and 4, the base member 14 includes a plurality of base magnetic elements 78 distributed about the base axis 68 and positioned generally at the corners of the base face 50. Each of the base magnetic elements 78 is attached to an attachment 52 defined by the base face 50. In a non-limiting example, the attachment 52 is configured as a post defining a cavity to receive the base magnetic element 78. The attachment 52 may also be referred to herein as a base post 52. Each of the base magnetic elements 78 includes and/or defines a base terminal 80. As shown in FIGS. 1 and 3, the module 12 includes a plurality of module magnetic elements 74 distributed about the module face 30 and positioned generally at the corners of the module face 30. Each of the module magnetic elements 74 is attached to an attachment 34 defined by the module face 30. In a non-limiting example, the attachment 34 is configured as a post defining a cavity to receive the module magnetic element 74. The attachment 34 may also be referred to herein as a module post 34. Each of the module magnetic elements 74 includes and/or defines a module terminal 76.

Figure 6:
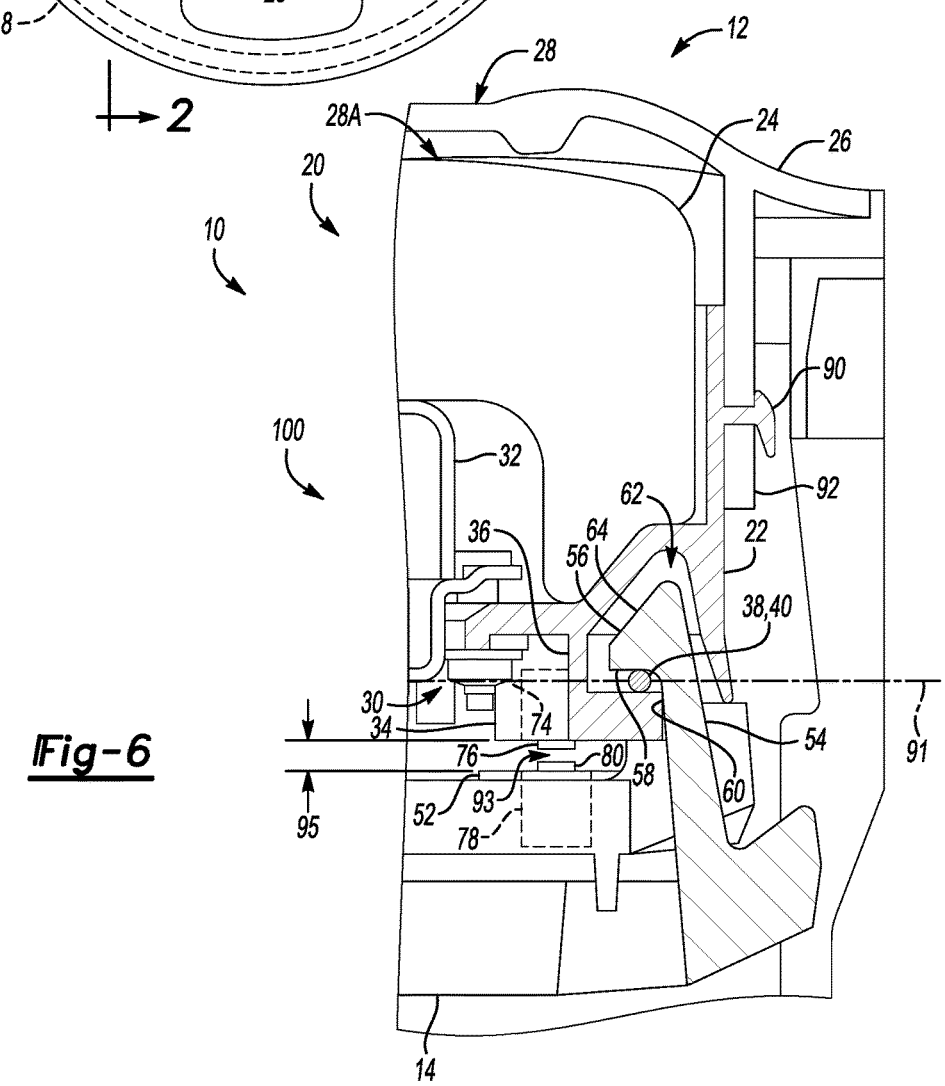
FIG. 6 is a schematic partial cross-sectional view of section 6-6 of FIG. 5 showing the switch actuation apparatus, including a set of paired magnetic elements, the module including a tether, and the armature base including a latching member, in a tethered, non-actuated condition.

The module 12 is movably tethered to the base member 14 by engagement of the tethering member 38 to a latching member 54 such that, as shown in FIGS. 1 and 6, each of the module magnetic elements 74 is aligned with a respective base magnetic element 78 along a magnet axis 88 to form a paired magnet set 84. In the example shown in FIG. 1, the module and base magnetic elements 74, 78 are aligned to form a plurality of paired magnet sets 84A, 84B, 84C and 84D, distributed about the base axis 68, and generally at the corners of the base face 50 and module face 30. The paired magnet sets may be referred to collectively as paired magnet sets 84 or individually as a paired magnet set 84 when generally referring to any one of the magnet sets 84.

Each of the module and base magnetic elements 74, 78 defines a first pole 86 and a second pole 96, where the first pole 86 is one of a north magnetic pole and a south magnetic pole, and the second pole 96 is the other of the north magnetic pole and the south magnetic pole. As shown in FIG. 1, each of the module magnetic elements 74 is oriented such the module magnetic element 74 is attached to module post 34 with its second pole 96 oriented toward the module face 30 and its first pole 86 oriented away from the module face 30. As shown in FIG. 1, each of the base magnetic elements 78 is oriented such that the base magnetic element 78 is attached to base post 52 with its second pole 96 oriented toward the base face 50 and its first pole 86 oriented away from the base face 50. As such, when the module and base magnetic elements 74, 78 of each of the respective paired magnet sets 84 are brought in proximity such that they are separated by a distance less than an equilibrium distance 95A defined by the module and base magnetic elements 74, 78, a repulsive magnetic force is generated between first poles 86 of the paired module and base magnetic elements 74, 78 of each paired magnet set 84. When the paired module and base magnetic elements 74, 78 are separated by a distance greater than the equilibrium distance 95A, it would be understood that the repulsive magnetic force between the paired module and base magnetic elements 74, 78 would be negligible, e.g., would go to zero. Similarly, it would be understood that as the separation distance between the paired module and base magnetic elements 74, 78 is decreased to a distance less than the equilibrium distance 95A, the repulsive magnetic force between the paired module and base magnetic elements 74, 78 would be greater than zero, and would increase in proportion to the decrease in the distance between the paired module and base magnets 74, 78. In the tethered condition, as shown in FIG. 7B, the module 12 is retained by the tethering member 38 engaged by the latching member 54 at a separation distance 95B, where the separation distance 95B is less than the equilibrium distance 95A, such that a repulsive magnetic force greater than zero is generated between each of the paired magnet sets 84 to suspend the module face 30 away from the base face 50, to create a terminal gap 93, as shown in FIGS. 6 and 7B, between the module and base magnetic elements 74, 78 of each of the paired magnet sets 84.

The base face 50 includes, in the non-limiting example shown, a pair of opposing latching members 54 extending from the base face 50. In an assembled condition, the latching members 54 engage tethering segments 40 of the tethering member 38 to tether the hub module 12 to the armature 14, where in the tethered condition the hub module 12 is movable relative to the armature 14. As shown in FIGS. 1, 4 and 6, each of the latching members 54 includes a latch hook 56, which may also be referred to herein as a latch or a hook 56. The hook includes a latch face 58 which is intermediate an incline face 64 and an adjacent face 60. With the module 12 tethered to the base 48, a tethering segment 40 of the tethering member 38 is engaged with the hook 56 of each of the latching members 54, as shown in FIG. 6, such that the module magnetic element 74 and the base magnetic element 78 are separated at a separation distance 95B (see FIG. 7B), where at the separation distance 95B, a repulsive magnetic force generated by the paired magnet sets 84 acts to push the module face 30 away from the base face 50, such that the repulsive magnet force acts to push the tethering segment 40 against the latch face 58. The latch face 58 exerts a latching force on the tethering segment 40 in opposition to the repulsive magnetic force to tether the module 12 to the base 48 such that the module 12 and the module face 30 are suspended over the base face 50 and the module 12 remains movable relative to the base 48 by an actuation force F exerted on the module cover 26. The separation distance 95B is less than an equilibrium distance 95A (see FIG. 7A), where, at the equilibrium distance 95A, the base and module magnetic elements 74, 78 of each paired magnet set 84 are sufficiently separated such that the repulsive magnetic force between the base and module magnetic elements 74, 78 is negligible or non-existent, e.g., goes to zero. As such, it would be understood that the separation distance 95B must be less than the equilibrium distance 95A to generate the repulsive magnetic force required to suspend the module face 30 away from the base face 50 in a non-actuated condition, e.g., to maintain a terminal gap 93 between the base and module terminals 80, 76 as shown in FIG. 7B. Similarly, it would be understood that an actuation force F applied to the actuating surface 28 of the module cover 26 must be greater than the repulsive magnetic force generated at the separation distance 95B, to initiate movement of the module face 30 toward the base face 50, and must be sufficient to overcome the repulsive magnetic force generated between the module and base magnetic elements 74, 78 of a paired magnet set 84 at a contact distance 95C (see FIG. 7C) to make contact between the module and base terminals 76, 80 of the paired magnet set 84 to generate an output signal, e.g., to close the switch defined by the actuation apparatus 100.

The armature base 48 defines a base axis 68 which is central to the base 48. In the tethered condition, the hub module 12 is axially movable relative to the armature base 48 along the base axis 68. The latching members 54 define a latch axis 91, which is perpendicular to and intersects the base axis 68, to define a pivot point 66 at the intersection of latch axis 91 and base axis 68, as shown in FIG. 4. In the tethered condition, the hub module 12 is pivotable relative to the armature base 48, about the pivot point 66, such that in the tethered condition the module face 30 is movable axially along the base axis 68 and pivotable about the pivot point 66, relative to the base face 50, in response to an actuation force F applied to the actuation surface 28, where the actuation force F can be applied from any direction to the actuation surface 28, as illustrated by the example actuation forces Fa, Fb, Fc . . . Fx shown in FIG. 2. As such, the first and second latching members 54 engage the tethering member 38 to movably tether the module 12 to the base member 14 such that the module 12 is pivotable relative to the base member 14 about the pivot point 66, and such that the module 12 is pivotable in response to an actuation force F which is skewed to the base axis 68 to cause contact between fewer than all the paired magnet sets 84, where contact between the base and module terminals 80, 76 of only one of the paired magnet sets 84 is required to generate the output signal. The actuation apparatus 100 is advantaged by the pivoting movement of the module 12, by enabling actuation of the apparatus, e.g., actuation of the horn switch, via an actuation force F applied to any portion of the hub cover 26, such that the actuation surface is not limited, for example, to a limited area of the hub cover 26 and such that the actuation force F does not have to be applied in a direction parallel to or along the base axis 68.

Figure 7A:
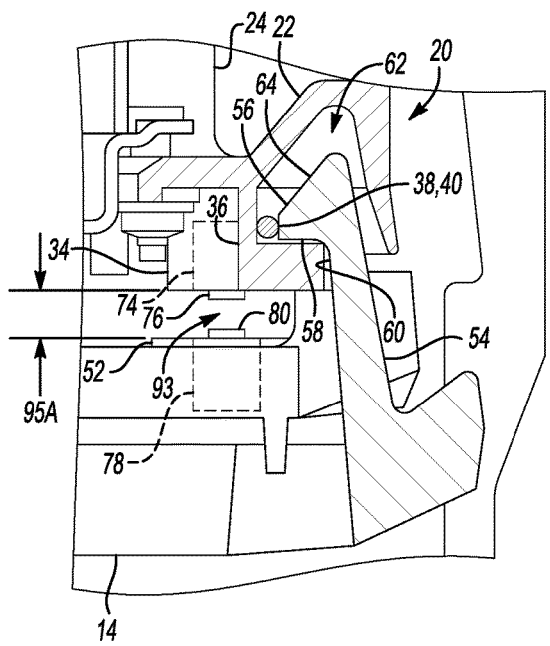
FIG. 7A is a schematic partial view of the cross-sectional view of FIG. 6 showing the module untethered from the armature base, with the set of paired magnetic elements spaced at an equilibrium distance.
Figure 7B:
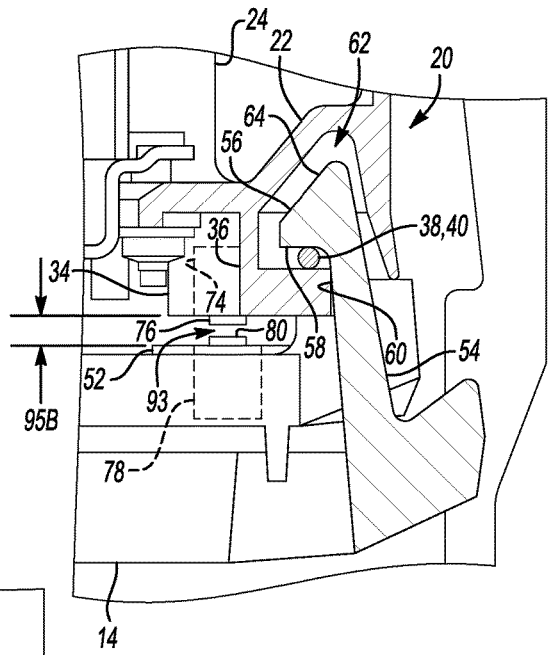
FIG. 7B is a schematic partial view of the cross-sectional view of FIG. 6 showing the module tethered to the armature base, with the set of paired magnetic elements spaced at a separation distance.
Figure 7C:
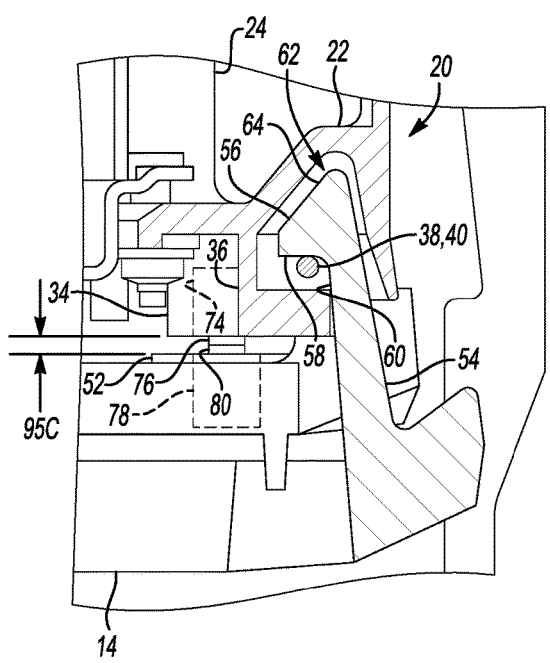
FIG. 7C is a schematic partial view of the cross-sectional view of FIG. 6 showing the module tethered to the armature base, with the set of paired magnetic elements spaced at a contact distance.

The actuation apparatus 100 is actuated to output the output signal when actuated by an actuation force F applied to the actuation surface 28 defined by the module 12 and is sufficient to overcome the repulsive magnetic force generated between at least one of the paired magnet sets 84 such that contact is made between the module and base terminals 76, 80 of the at least one of the paired magnet sets 84, e.g., such that the distance between the module and base magnetic elements 74, 78 of the at least one paired magnetic set 84 is decreased from a non-actuated separation distance 95 to a actuated contact distance 95C, as shown in FIGS. 7B and 7C. The actuation force F can be applied to any portion of the actuation surface 28, e.g., at any location on the hub cover 26, and from any direction, as shown in FIG. 2 by non-limiting example actuation forces Fa, Fb, Fc . . . Fx, where it would be understood that the module 12 and module face 30 would be moved in at least one of an axial or pivoting movement, relative to the base face 50, in response to application of an actuation force F including example actuation forces Fa, Fb, Fc . . . Fx, causing contact to be made between the module and base terminals 76, 80 of at least one of the paired magnet sets 84.

When contact is made between the module and base terminals 76, 80 of at least one of the paired magnet sets 84, an output signal is outputted from the actuation apparatus 100. The output signal is outputted, for example, to a device electrically connected to the actuation apparatus 100, such that the device is activated by the output signal. In the illustrative example, the actuation apparatus 100 is configured as a horn switch of the steering wheel assembly 10, to output an output signal to activate a vehicle horn (not shown), where the vehicle horn is electrically connected to the actuation apparatus 100 to receive the output signal. In a non-limiting example, the vehicle horn is activated to output an audible signal, such as a horn blast, when the output signal is received.

The actuation force F is input to the hub cover 26 and via the interface surface 28A of the air bag 24 to move the wheel hub module 12 toward the base face 50 of the armature base 48. The horn effort, e.g., the actuation force F required to move the module 12 in contact with the armature base 48 to make contact between the terminals of one of the paired magnet sets 84, is defined by the repulsive magnetic force generated between each of the paired magnet sets 84, which is constant over time for each paired magnet set 84, e.g., is not susceptible to change by environment conditions, corrosion, wear, etc. as would be experienced by a mechanical system, such as a spring actuated system. As such, the horn effort required to actuate the actuation apparatus 100, e.g., the horn switch of the steering wheel assembly 10, remains substantially constant over time in use. The constant repulsive magnetic force maintains the separation distance 95B between the terminals over time and is sufficient to oppose the gravitational forces 72 exerted by the module 12 such that actuation variability due to sag, wear and/or fatigue is avoided, as the non-mechanical magnetic properties of the paired magnet sets 84 remain unchanged over time. For example, the steering wheel assembly 10 is configured for attachment to a steering shaft (not shown) by a steering wheel retainer 98 (see FIG. 1) such that in an installed position, the steering wheel assembly 10 is rotatable about a rotation axis 70 to provide steering input to the vehicle, e.g., to rotate the steering shaft. FIG. 2, which shows a perspective cross-sectional view of section 2-2 of the steering wheel assembly 10 of FIG. 5. As shown in FIG. 2, rotation axis 70 is offset from the base axis 68 and a plane defined by the base axis 68 and the latch axis 91 such that the rotation axis 70 is non-coincidental with the base axis 68. As shown in FIG. 2, a center of gravity 82 of the hub module 12 is offset from the rotation axis 70, such that, in the absence of a counteracting force, a resultant gravitational force 72 acts to rotate the hub module 12 downward in a clockwise direction (as shown on the page in FIG. 2). It would be understood that as the steering wheel assembly 10 including the hub module 12 is rotated about the rotation axis 70, the gravitational force 72 would act on the hub module 12 such that the portion of the hub module 12 in the lowermost position, e.g., below the center of gravity 82 as shown on the page for FIG. 2 would be acted on by the gravitational force 72 to rotate downward, e.g., to sag toward the base face 50. As further described herein, in a tethered non-actuated condition, a repulsive magnetic force generated between the module and base magnetic elements 74, 78 of the paired magnet sets 84 counters the gravitational force 72, to maintain a constant separation distance 95B between the module and base magnetic elements 74, 78 of each of the paired magnet sets 84A, 84B, 84C, 84D, thus preventing rotation, e.g., sag, of the module hub 12 as a result of the gravitational force 72.

The actuation apparatus 100 is actuated by application of an actuation force F to the actuation surface of the module 12, in opposition to the repulsive magnetic force, where the actuation force F is greater than the repulsive magnetic force, causing axial and/or pivoting movement of the module 12 toward the base member 14 such that contact is made between the module terminal 76 and the base terminal 80 of at least one of the paired magnet sets 84 to generate an output signal. The repulsive magnetic force generated by each of the paired magnet sets 84 resists movement of the module 12 toward the base member 14 by incidental force inputs to the actuation surface less than the actuation force F, thus making the actuation apparatus 100 robust against incidental or non-intentional actuation. Over time in use, the repulsive magnetic force generated between each of the paired magnet sets 84 remains substantially constant, such that the separation distance 95B is maintained over time in use, and is not subject to change, for example, due to component wear, corrosion or fatigue within the actuation apparatus 100, gravitational forces 72 acting on the module 12 relative to the base member 14, or other factors such as operating environmental factors such as temperature, humidity, etc. As such, the actuation apparatus 100 described herein provides increased durability of the actuation apparatus 100 relative to, for example, mechanically actuated switches such as those including springs or other componentry which may corrode, fatigue, and/or wear over time in use. Further, due to the substantially constant and repeatable repulsive magnetic force generated between each of the paired magnet sets 84 over time, the separation distance 95B maintained between the terminals of the paired magnet sets 84 is substantially constant over time, and the actuation force F (horn effort in the illustrative example) required to actuate the apparatus, e.g., to overcome the repulsive magnetic force to make contact between the terminals of at least one of the paired magnet sets 84 to generate the output signal, is substantially constant and repeatable over time, providing an actuation apparatus 100 with increased reliability and repeatability relative to a mechanically actuated apparatus.

A method for assembly of the actuation apparatus 100 is provided. The method includes orienting the module 12 relative to the base member 14 such that the module face 30 and the base face 50 are adjacent and each of the base magnetic elements 78 is aligned with a respective one of the module magnetic elements 74 to form the plurality of paired magnet sets 84. Each of the module face 30 and the base face 50 can include respective module and base anti-rotation elements 97, 99 which can be configured, for example, such that each module anti-rotation element 97 cooperates with a respective base anti-rotation element 99 to facilitate orienting the module 12 relative to the base member 14 during assembly. The module face 30 includes recesses 62 to receive the latching member 54 during assembly of the module 12 to the base member 14, where each recess 62 is configured, as shown in FIGS. 6-7C, to provide clearance for movement of the latching member 54 during assembly and actuation of the actuation apparatus 100. In one example, the base and module anti-rotation elements 99, 97 can be keyed to each other or otherwise cooperate such that rotation of the module 12 relative to the base member 14 and about the base axis 68 is limited or prevented, while allowing the module 12 to be movably tethered to and pivotable relative to the base member 14. The method of assembling the module 12 to the base member 14 further includes applying an assembly force on the module 12 in opposition to the repulsive magnetic force generated between the module 12 and base magnetic elements 78 of each of the paired magnet sets 84, to engage the tethering member 38 and the latching members 54. The assembly force is then released such that the latching member 54 which in an illustrative example is configured as a hook 56, upon release of the assembly force, exerts a tethering force on the tethering member 38 engaged by the latching member 54, in opposition to the repulsive magnetic force, to maintain the separation distance 95B between the module 12 and base magnetic elements 78. In an illustrative example, the tethering member 38 is configured as a cable or wire member, and the hook 56 of the latching member 54 defines an incline face 64 adjacent to a latch face 58. During assembly, the module 12 is moved toward the base member 14 to decrease the distance between the module and base magnetic elements 74, 78 of each of the paired magnet sets 84 from the equilibrium distance 95A to the separation distance 95B, as shown in FIGS. 7A and 7B, such that the tethering segment 40 of the tethering member 38 contacts the incline face 64 and is placed in tension as the tethering segment 40 travels along the incline face 64 by continued application of the assembly force and movement of the module 12 toward the base member 14, until the cable of the tethering segment 40 engages the latch face 58, that is, until the tethering segment 40 travels past the incline face 64 and is engaged by the hook 56 to movably tether the module 12 to the base member 14. The assembly method is advantaged by not requiring any fixtures or tooling, as the module 12 is self-orienting via the anti-rotation elements 97, 99 and snaps into place by engagement of the cable tethering member 38 and the hook 56 of the latching member 54.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An actuation apparatus comprising:
   a steering wheel armature including a base member;
   wherein a module includes an air bag assembly;
   the base member having a base defining a base axis and a base face;
   wherein the steering wheel armature is rotatable about a rotation axis;
   wherein the rotation axis and the base axis are non-coincident;
   a plurality of base magnetic elements mounted to the base face and distributed around the base axis;
   the module having a module face; and
   a plurality of module magnetic elements mounted to the module face;
   wherein the module is movably tethered to the base member;
   wherein each of the base magnetic elements is aligned with a respective one of the module magnetic elements to form a paired magnet set such that the plurality of module magnetic elements and the plurality of base magnetic elements form a plurality of paired magnet sets; and
   wherein the base magnetic element and the module magnetic element of each paired magnet set are oriented such that a repulsive magnetic force is generated between the base magnetic element and the module magnetic element of each paired magnetic set.

2. The apparatus of claim 1, wherein in a non-actuated condition, the base magnetic element and the module magnetic element of each paired magnet set are separated by a separation distance partially defined by the repulsive magnetic force.

3. The apparatus of claim 2, wherein the apparatus is actuated by contact between the base magnetic element and the module magnetic element of at least one of the paired magnet sets.

4. The apparatus of claim 3, further comprising:
   an actuation surface defined by the module and configured to receive an actuation force;
   wherein the actuation force is greater than the repulsive magnetic force such that the actuation force causes movement of the module face toward the base face and contact between the base magnetic element and the module magnetic element of at least one of the paired magnet sets.

5. The apparatus of claim 3, wherein contact between the base magnetic element and the module magnetic element of the at least one paired magnet set generates an output signal.

6. The apparatus of claim 2, wherein:
   each paired magnet set is characterized by an equilibrium distance; and
   the separation distance is less than the equilibrium distance.

7. The apparatus of claim 2, further comprising:
   a tethering member attached to the module face; and
   a latching member attached to the base face;
   wherein the latching member engages the tethering member such that the module is movably tethered to the base member.

8. The apparatus of claim 7, wherein the separation distance is further defined by engagement of the tethering member with the latching member.

9. The apparatus of claim 7, wherein the latching member comprises a hook; and
   wherein the tethering member is engaged by the hook.

10. The apparatus of claim 7, wherein the tethering member comprises a cable.

11. The apparatus of claim 7, wherein the latching member is a first latching member, the apparatus further comprising:
    a second latching member attached to the base face; and
    a latch axis defined by the first and second latching members;
    wherein the latch axis and the base axis intersect to define a pivot point;
    wherein the first and second latching members engage the tethering member to movably tether the module to the base member; and
    wherein the module is pivotable relative to the base member about the pivot point.

12. The apparatus of claim 1, further comprising:
    a base anti-rotation element connected to the base face; and
    a module anti-rotation element connected to the module face;
    wherein the base anti-rotation element and the module anti-rotation element cooperate to prevent rotation of the module about the base axis.

13. The apparatus of claim 1, wherein the module further comprises:
    a hub cover attached to the air bag assembly.

14. The apparatus of claim 1, wherein the module exerts a gravitational force relative to the base axis; and
    wherein the repulsive magnetic force counters the gravitational force such that the separation distance between each of the paired magnet sets remains constant during rotation of the steering wheel armature about the rotation axis.

15. A method of assembling an actuation apparatus including a module and a base member, wherein:
the base member is a steering wheel armature;
the module is a hub module including an air bag assembly;
the base member comprises:
a base including the base face and defining a base axis;
at least one latching member attached to the base face; and
a plurality of base magnetic elements mounted to the base face and distributed around the base axis;
the module comprises:
a module face;
a tethering member attached to the module face; and
a plurality of module magnetic elements mounted to the module face;
the steering wheel armature is rotatable about a rotation axis; and
the rotation axis and the base axis are non-coincident;
the method comprising:
orienting the module relative to the base member such that the module face and the base face are adjacent and each of the base magnetic elements is aligned with a respective one of the module magnetic elements to form a paired magnet set such that the plurality of module magnetic elements and the plurality of base magnetic elements form a plurality of paired magnet sets;
wherein a repulsive magnetic force is generated between the base magnetic element and the module magnetic element of each paired magnetic set; and
applying an assembly force on the module in opposition to the repulsive magnetic force to engage the tethering member and the latching member.

16. The method of claim 15, further comprising:
releasing the assembly force such that the module moves to a non-actuated position relative to the base member;
wherein in the non-actuated position:
the module is movably tethered to the base member by engagement of the tethering member and the latching member; and
the base magnetic element and the module magnetic element of each paired magnet set are separated by a separation distance defined by the repulsive magnetic force and the engagement of the tethering member and the latching member.

17. The method of claim 15, wherein:
the latching member comprises a hook; and
wherein module is movable tethered to the base member by engagement of the hook and the tethering member.

18. An actuation apparatus comprising:
a steering wheel armature including a base member;
wherein the module includes an air bag assembly;
the base member having a base defining a base axis and a base face;
a plurality of base magnetic elements mounted to the base face and distributed around the base axis;
a module having a module face;
a plurality of module magnetic elements mounted to the module face;
a tethering member attached to the module face; and
a latching member attached to the base face;
wherein the tethering member comprises a cable;
wherein the latching member engages the tethering member such that the module is movably tethered to the base member;
wherein each of the base magnetic elements is aligned with a respective one of the module magnetic elements to form a paired magnet set such that the plurality of module magnetic elements and the plurality of base magnetic elements form a plurality of paired magnet sets;
wherein the base magnetic element and the module magnetic element of each paired magnet set are oriented such that a repulsive magnetic force is generated between the base magnetic element and the module magnetic element of each paired magnetic set;
wherein in a non-actuated condition, the base magnetic element and the module magnetic element of each paired magnet set are separated by a separation distance partially defined by the repulsive magnetic force.

* * * * *